(12) United States Patent
Laurash et al.

(45) Date of Patent: Dec. 28, 2004
(10) Patent No.: US 6,836,215 B1

(54) PRINTABLE IDENTIFICATION BAND WITH TOP STRIP FOR RFID CHIP ATTACHMENT

(75) Inventors: David F. Laurash, Bellbrook, OH (US); Patrick A. Konkol, Troy, OH (US); Gary M. Cairns, Tipp City, OH (US)

(73) Assignee: The Standard Register Company, Dayton, OH (US)

( * ) Notice: Subject to any disclaimer, the term of this patent is extended or adjusted under 35 U.S.C. 154(b) by 370 days.

(21) Appl. No.: 10/054,035

(22) Filed: Jan. 22, 2002

(51) Int. Cl.[7] ............................................... G08B 13/14
(52) U.S. Cl. ............................... 340/572.1; 340/572.8; 156/60; 283/75; 283/109
(58) Field of Search ........................... 340/572.1, 572.8, 340/573.1, 573.4; 283/75, 109; 156/60

(56) References Cited

U.S. PATENT DOCUMENTS

| | | | |
|---|---|---|---|
| 5,312,136 A | * | 5/1994 | Capozzola .................... 283/75 |
| 5,653,472 A | | 8/1997 | Huddleston et al. |
| 5,883,576 A | | 3/1999 | De La Huerga |
| 5,933,993 A | | 8/1999 | Riley |
| 5,973,598 A | | 10/1999 | Beigel |
| 5,973,600 A | | 10/1999 | Mosher, Jr. |
| 5,979,941 A | | 11/1999 | Mosher, Jr. et al. |
| 6,016,618 A | | 1/2000 | Attia et al. |
| 6,067,739 A | | 5/2000 | Riley |
| 6,100,804 A | | 8/2000 | Brady et al. |
| 6,181,287 B1 | | 1/2001 | Beigel |
| 6,206,292 B1 | * | 3/2001 | Robertz et al. ............. 235/488 |
| 6,404,341 B1 | * | 6/2002 | Reid ....................... 340/572.8 |

FOREIGN PATENT DOCUMENTS

WO    WO 03/009224 A1    1/2003

* cited by examiner

*Primary Examiner*—Anh V. La
(74) *Attorney, Agent, or Firm*—Dinsmore & Shohl LLP

(57) ABSTRACT

An information band for mounting an electrically conductive circuit, such as a radio-frequency identification (RFID) tag. The band comprises a base strip and a top strip. A single sheet of label stock can include a plurality of such bands such that the sheet can be passed through a conventional printer to accept printed indicia onto a surface of one or more bands. These bands can be die cut to facilitate individual removal. The top strip can be either integral with the base strip or a separate piece that can be affixed to a surface of the base strip. Once indicia has been printed to the band, the RFID tag may be manually affixed between the base strip and the top strip, where adhesive disposed therebetween secures the RFID tag. The adhesive may be peripherally deposited such that an adhesive-free zone is formed between the two layers so that when the RFID tag is attached, it does not come in contact with the adhesive.

47 Claims, 13 Drawing Sheets

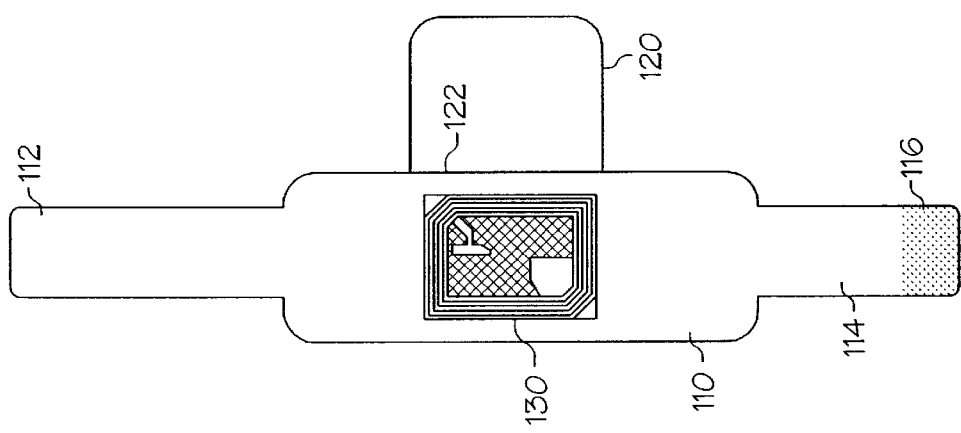
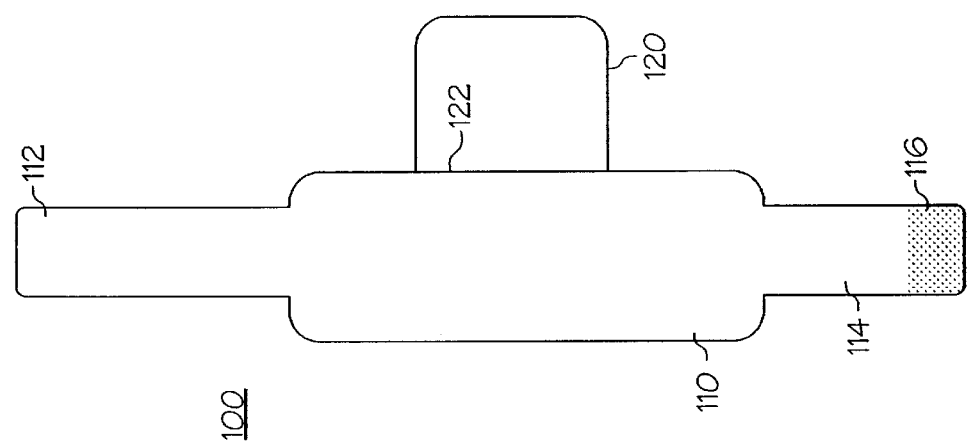

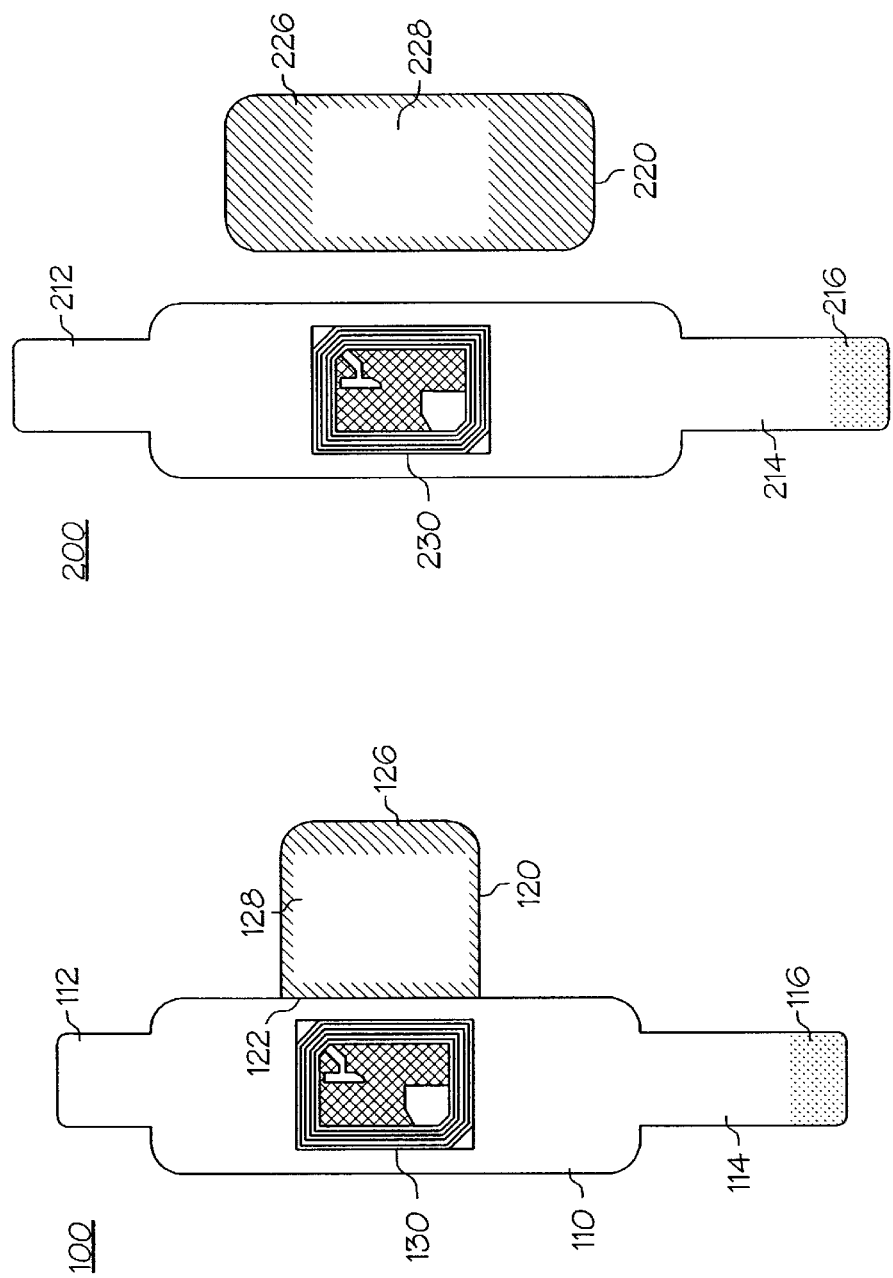

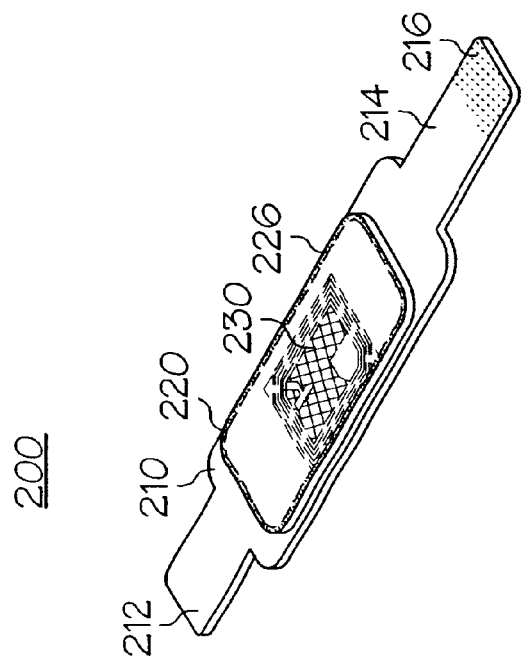
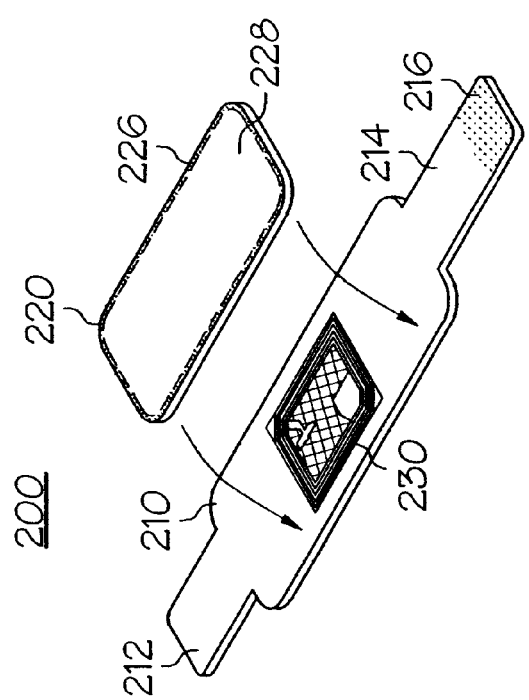
FIG. 9B
FIG. 9A

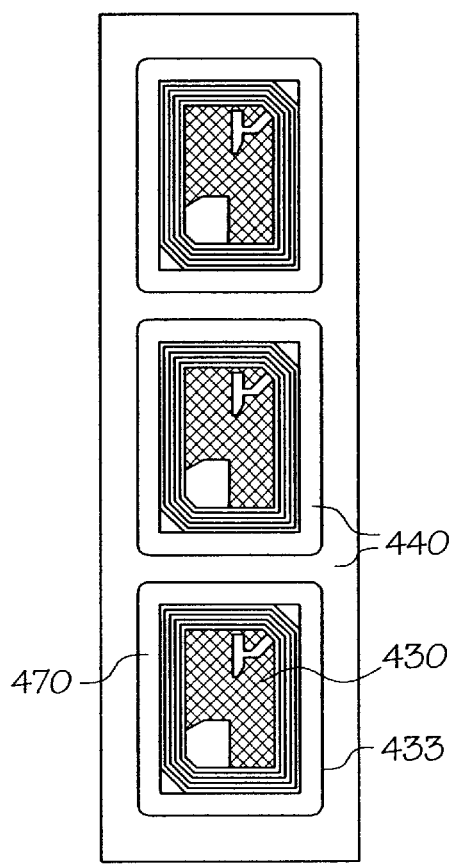
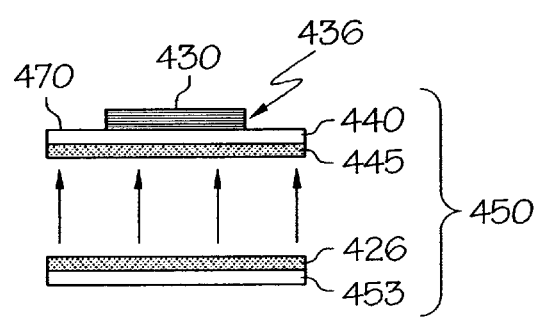
FIG. 11B
FIG. 11A
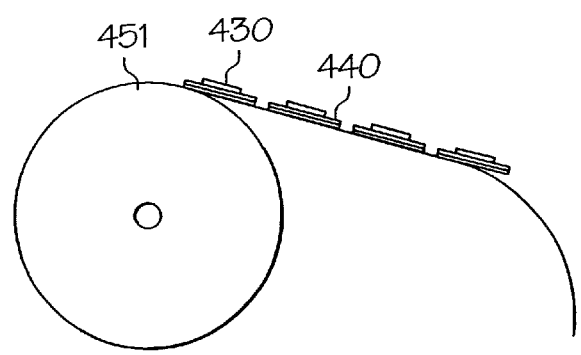
FIG. 11C

PRINTABLE IDENTIFICATION BAND WITH TOP STRIP FOR RFID CHIP ATTACHMENT

BACKGROUND OF THE INVENTION

The present invention is directed generally to a printable identification band that can accommodate a thin radio frequency identification (RFID) chip (alternatively referred to as a tag) therein, and more particularly to a top strip used in conjunction with the identification band so that the RFID tag can be affixed to the identification band after user-unique information is printed onto the band from a conventional automated printer device.

Identification bands that include various types of information are in common use. For example, information relating to a wearer of a wristband, such as a hospital patient, personnel requiring access to sensitive or secure areas, or an event attendee is placed on the band to convey information germane to the wearer to a third party. Similar uses could also apply to goods in transit (such as airline baggage) and animals (such as veterinary patients, tagged wildlife or herds of semi-domesticated sheep, cattle, horses or the like). By way of example, information specific to the person to which the band is attached can include (for health-care related matters) name, social security number, primary physician, health insurance coverage, allergies and related known health history, and the nature of the ailment, while security information can include employee numbers and level of access, and proper seating assignments (for event attendees), just to name a few. Prior to the advent of electronic data processing and printing equipment, such information would be manually written or typed, then transcribed to a bracelet that could be placed on a wearer's extremity, such as wrist or ankle, for ease of identification by appropriate personnel. Errors in transcription and legibility of the printed indicia on the wristband could result in incorrect identification of vital wearer information. The availability of modern computing and printing equipment, as well as data storage and communication means has significantly reduced the likelihood of such errors occurring, as information entered into a database is automatically processed and printed directly onto a sheet-like form that includes an elongate strip that can be formed into an identification band. Simultaneously, some or all of the same information can be printed onto labels situated on the same form. The form is typically made from multiple plies, where the top (or face) ply capable of accepting printing thereon is adhesively bonded to a release layer (such as a conventional silicone coating) disposed on a liner ply. An example of a form with cut-outs for labels and wristbands that can be fed into a printer to accept patient-unique information is U.S. Pat. No. 5,653,472 to Huddleston et al., owned by the assignee of the present invention.

One frequently-used way to include automated, machine-readable data onto the identification band is through bar codes, where appropriate information can be printed from a conventional printer onto a surface of the band such that it can be later read by a bar code scanner. These devices, while inexpensive and useful for small amounts of information, have drawbacks. For example, the range of the scanner is such that the reader must be in close proximity to the bar code. In addition, the scanner must be oriented relative to the bar code in a limited number of angles to effect a proper reading. In addition, the scanner must maintain a direct line-of-sight with the bar code. Not only does this necessitate the proper orientation discussed above, but also that no obstructions be placed in the path of the scanning laser. For example, if the bar code is obscured by dirt, grime or other optically opaque materials, the scanner will not be able to pick up the information embedded in the bar code. These limitations reduce the ability to efficiently extract information from the identification band.

These limitations in bar code scanning prompted research into a more effective form of information storage and retrieval for identification devices, such as RFID tags. The tags are electrically conductive circuits that include encoding circuitry (such as a memory device that can be programmed to hold unique information) and signal-generating circuitry (including an antenna) to facilitate the transfer of information between the encoding circuitry and a remote reader. These tags are thin, and can either be fabricated from discrete components or placed directly onto a substrate through deposition of conductive inks or foils. RFID tags can further be active or passive devices. With active devices, which include an onboard source of power (typically from a battery), greater detection ranges and information storage capacity are possible. With passive devices, the power comes from the electromagnetic field produced by the remote reader; consequently, they typically have less range than the active devices, but are simpler and cheaper to build, and don't suffer from life limitations in the same way a battery-based device would. The thin construction of the RFID tag permits application to flexible substrates where space is critical and significant amounts of flexure in the substrate can be accommodated without damage to the electronic circuitry.

Nevertheless, disadvantages associated with the use of RFID tags for identification bands persist. For example, RFID tags have little or no compatibility with existing high speed automated printing devices such as laser and thermal printers common to most business, commercial and professional environments. The heat and pressure of a typical laser printer is sufficient to jeopardize the integrity of an RFID circuit. Similarly, the additional thickness of the form making up the identification band caused by the presence of an RFID circuit may score the print drum or print head of a conventional laser or thermal printer, respectively. The increases in productivity afforded by modem printing devices, which is not something users are going to readily forego, would be severely curtailed if special accommodations had to be made every time an RFID tag were to be generated, or if the equipment suffered increases in downtime due to damaged print heads and drums. While these accommodations could conceivably be somewhat meliorated through the introduction of robust circuitry or post-attachment quality check devices (such as a read head designed to sense and compare information placed on the RFID tag), such approaches involve significant increases in the production cost of identification bands.

One way to avoid damage to either the RFID tag or the printer is to apply the RFID tag after the identification band has received printed indicia on its surface. This technique alone does not, however, circumvent the cost disadvantage of the RFID approach vis-à-vis the conventional bar code device, which due to being typically nothing more than bands of printed ink applied to a label, is inherently inexpensive. Current methods of applying the RFID tag to the identification band after indicia has been printed thereon by a conventional printer require an additional piece of automated equipment that either attaches to or is integral with the printer. Such additional componentry introduces greater expense and complexity to the process. Similarly, the application of an RFID tag to an identification band often results in permanent (in the case of deposited films or foils) or semi-permanent (in the case of embedded devices between laminated label layers) adhesion of the latter to the former. This is disadvantageous in that in the event the identification bands become damaged or soiled, they would have to be discarded, thus wasting the integrated or laminated tag. Accordingly, RFID tags, even if possessive of superior information storage capacity to bar codes, will never be cost-competitive as long as they require additional support hardware or cannot be easily removed from the identification band and reused.

Accordingly, there is a need for an identification band that can easily accommodate an electrically conductive circuit such as an RFID tag. There is an additional need to form the band from a sheet that is amenable to automated printing such that after printed indicia is placed on a surface of the band, the RFID tag can be affixed thereto. There exists another need for such an identification band that holds the RFID tag in such a way that the tag can be easily removed and reused.

SUMMARY OF THE INVENTION

These needs are met by the present invention, which is directed to an identification band formed from a printer-compatible sheet. According to a first aspect of the invention, a method of making an identification band is disclosed. The method first includes configuring a layer of label stock to include a base strip, a top strip adapted to engage the base strip, a first adhesive layer disposed on at least a portion of the base strip to promote bonding between overlapping members of the base strip brought into contact with one another during formation of the band, and a second adhesive layer disposed on at least a portion of one or both of the base or top strips to from an adhesive bond between them. In addition, the method includes providing the layer of the label stock to a printer, printing indicia (such as alphanumeric characters or a bar code label) on at least one surface of the layer of the label stock, manually attaching an electrically conductive circuit to a surface of the layer of the label stock after indicia has been printed on the label stock by the printer, and placing the top strip over the base strip such that the electrically conductive circuit is encased between them. By placing the electrically conductive circuit on after the label stock has passed through the printer, damage to the circuit or printer componentry is avoided. In addition, costly post-application electronic quality tests to ensure that the printing step has not corrupted the electrical integrity of the circuit are avoided. The label stock is preferably a sheet-like form or a continuous roll of individual labels. Note that while the top strip of the label stock is preferably of an elongate construction, it need not be, as it could be of any suitable label dimension. Preferably, the printer is an automated printing device, such as that responsive to computer control. Examples include laser, thermal, thermal transfer, mechanical impact and ink jet printers.

Preferably, the electrically conductive circuit is an RFID circuit. As used in the present disclosure, an electrically conductive circuit is any arrangement of discrete electronic components electrically interconnected with one another such that electrical current can flow therebetween in order to perform a predetermined electrical function. Also as used herein, an RFID circuit is a particular type of electrically conductive circuit, and the term refers generally and interchangeably to any RFID construction, including the more common chip, printed ink and deposited layer variants. Optionally, the RFID tag is affixed to a liner prior to the manually attaching step, and the liner includes a layer of release coating disposed on a side opposite that to which the RFID tag is affixed. This allows for an alternate way to mount the RFID tag to the identification band, as the step of manually attaching can now be accomplished by pressing the RFID tag, affixed liner and release coating onto the second adhesive layer of the identification band, thereby engaging the second adhesive layer to the release coating included on the liner. The top strip is a flap integral with the base strip such that the part of the identification band used to encase the electrically conductive circuit is of one-piece construction from a single piece of material. More particularly, the integral flap can be disposed on a lateral side of the base strip, thus promoting easy folding. The relationship between the flap and base strip can be such that upon adhesion to the base strip and subsequent band formation, the integral flap is configured to face radially inward. The label stock can be further defined by a printable face ply and a liner ply that are coupled through adhesive and release coating between them. The face ply is defined at least in part by the base strip and the top strip. Furthermore, the liner ply can be substantially coextensive with the face ply. As used in the present context, the term "substantially" refers to an arrangement of elements or features that, while in theory would be expected to exhibit exact correspondence or behavior, may, in practice embody something slightly less than exact. To promote ease of electrically conductive circuit removal for possible reuse, the second adhesive can be disposed beyond the outer peripheral dimensions of the electrically conductive circuit such that the adhesive substantially circumscribes an adhesive-free zone on the top or base strip. Thus, when the electrically conductive circuit is encased in the identification band by the top and base strips, contact with the adhesive on the band is substantially precluded.

According to another aspect of the present invention, an identification band configured to bear transaction-unique printed indicia is disclosed. The identification band includes a base strip, an integral top flap adapted to overlap the base strip, a first adhesive layer disposed on at least a portion of the base strip to facilitate bonding between overlapping members of the base strip during formation of the band, a second adhesive layer disposed on at least a portion of at least one of the base strip or integral top flap, and an electrically conductive circuit disposed adjacent at least the base strip or the integral top flap such that the electrically conductive circuit is secured between the two when they are brought into adhesive engagement with one another.

Optionally, the second adhesive layer substantially circumscribes an adhesive-free zone on the surface of its respective base strip or integral top flap. The adhesive-free zone defined by the second adhesive layer is configured to accept the electrically conductive circuit such that all adhesive is beyond the periphery of the electrically conductive circuit. As with the previous embodiment, this promotes ease of attachment and (if required) subsequent removal of the electrically conductive circuit. Preferably, the electrically conductive circuit is an RFID tag, and it can optionally be configured to include an underlying liner and release coating, as discussed in conjunction with the previous embodiment. Also as with the previous embodiment, the integral top flap can be disposed on a lateral side of the base strip. Upon adhesion to the base strip and subsequent band formation, the integral flap is configured to face radially inward.

According to another aspect of the present invention, an identification band configured to bear printed indicia and electronic information. The identification band includes a base strip defined by at least one printable surface, a top strip adapted to engage the base strip, a first adhesive layer disposed on at least a portion of the base strip to facilitate bonding between overlapping members of the base strip during formation of the band, a second adhesive layer disposed on at least a portion of at least one of the base strip or top strip, and an electrically conductive circuit disposed adjacent at least the base strip or the top strip such that the electrically conductive circuit is secured between the two when they are brought into adhesive engagement with one another. The top strip is sized relative to the base strip such that upon coverage of the electrically conductive circuit between the two strips, the base and top strips are not coextensive with one another.

According to yet another aspect of the present invention, a form adapted to cooperate with an automated printer, such that indicia can be placed on the form from the printer, is disclosed. The form comprises a face ply with a plurality of identification bands disposed therein, and a liner ply disposed substantially coextensive with the face ply. An interply adhesive and a release coating are disposed between at least a portion of the face and liner plies to facilitate removable adhesion therebetween. Each of the identification bands includes a base strip, an integral top flap adapted to overlap the base strip in order to effect coverage of an electrically conductive circuit disposed therebetween, a first adhesive layer disposed on at least a portion of the base strip to facilitate bonding between overlapping members of the base strip during formation of the band, and a second adhesive layer disposed on at least a portion of at least one of the base strip or the integral top flap such that upon engagement therebetween, an adhesive bond is formed. In the present context, an automated printer is any print device that in response to a set of commands (such as from a computer or similar data processing device) conveys graphical or alphanumeric characters corresponding to those commands onto a printable medium (such as a label or piece of paper).

The form, which is preferably a sheet, can come in either cut-sheet size, for individual or stacked feeding into a conventional printer tray, or in a continuous roll, such as a Z-fold configuration, that can feed directly into a variety of printers, including mechanical impact, thermal, thermal transfer, ink jet, and laser printers. In addition to the plurality of identification bands, a plurality of accompanying labels can be placed on a single form sheet. The labels can be used for duplicate or related patient information, which can be printed directly from the printer. Both the identification bands and the labels can be die cut for ease of removal once indicia is printed thereon. The face ply of the form is printed in a single pass through a printer with the desired information. In the case of a wristband, the face ply may then be detached from the liner ply by peeling along a predetermined die cut line, then adhesively wrapping the band around the wearer's wrist by means of the first adhesive layer of pressure sensitive adhesive. The labels, which can also accept printed indicia thereon, may be removed as needed and adhered to complementary structures, forms, records or the like.

Optionally, the second adhesive layer substantially circumscribes an adhesive-free zone on the surface of its respective base strip or integral top flap. The adhesive-free zone defined by the second adhesive layer is configured to accept the electrically conductive circuit. In addition, the plurality of identification bands are die cut into the face ply to make it easier to peel the face ply from the liner ply. Moreover, as with the previous embodiment, the integral top flap can disposed on a lateral side of the base strip. Furthermore, upon adhesion to the base strip and subsequent band formation, the integral flap is configured to face radially inward.

According to another aspect of the present invention, a form adapted to cooperate with an automated printer such that indicia can be placed on the form from the printer is disclosed. The form comprises a face ply with a plurality of identification bands disposed therein, and a liner ply disposed substantially coextensive with the face ply. An interply adhesive and a release coating are disposed between at least a portion of the face and liner plies to facilitate removable adhesion between the plies. Each of the identification bands includes a base strip, a top strip adapted to engage the base strip in order to effect coverage of an electrically conductive circuit disposed between them, a first adhesive layer disposed on at least a portion of the base strip to facilitate bonding between overlapping members of the base strip during formation of the band, and a second adhesive layer disposed on at least a portion of at least one of the base strip or the top strip such that upon engagement between the two strips, an adhesive bond is formed.

According to still another aspect of the present invention, a method of making a wristband is disclosed. The method comprises configuring a layer of label stock to include a plurality of elongate base strips, a plurality of top strips, a first adhesive disposed on at least a portion of each of the plurality of elongate base strips, and a second adhesive layer disposed on at least a portion of a base strip-top strip pair, providing the label stock to a printer, printing indicia on at least one surface of at least one layer of the label stock, manually attaching an electrically conductive circuit to a surface of at least one base strip-top strip pair, and placing the top strip of the at least one base strip-top strip pair over the corresponding elongate base strip such that the electrically conductive circuit is adhesively encased therebetween. Each of the elongate base strips includes a proximal end and a distal end substantially opposite the proximal end, while each of the top strips is adapted to engage one of the plurality of elongate base strips to form the aforementioned base strip-top strip pair. The first adhesive layer facilitates bonding between the proximal and distal ends of each of the base strips such that when placed in overlapping contact with one another during formation of the wristband, the two ends adhere together. Likewise, the second adhesive layer is placed such that upon engagement between the base strip and the top strip, an adhesive bond is formed.

According to yet another aspect of the present invention, a method of making an identification band is disclosed. The first step involves configuring a layer of label stock to include a base strip, a flap integral with the base strip, a first adhesive layer disposed on at least a portion of the base strip to facilitate bonding between overlapping members of the base strip during formation of the band, and a second adhesive layer disposed on at least a portion of at least one of the base strip or the flap. Subsequent steps include providing the layer of the label stock to a printer, printing indicia on at least one surface of the layer of the label stock, manually attaching the RFID tag to a surface of the layer of the label stock after indicia has been printed on the at least one surface of the label stock, and folding the flap over the base strip such that the RFID tag is encased therebetween. Optionally, the method comprises the additional step of patterning the second adhesive layer such that an adhesive bond is formed of sufficient dimension as to preclude contact with an RFID tag disposed between the base strip and the flap. By way of example, the surface onto which the patterned adhesive layer is formed would be adhesive-free at any location where such surface contacts the RFID tag, with the adhesive layer disposed substantially around the outer periphery defined by the RFID tag. Alternatively, the RFID tag can optionally be configured to include an underlying liner and release coating, as discussed in conjunction the first aspect of the invention.

According to still another aspect of the present invention, a method of providing information to an identification band is disclosed. The method includes a first step of placing label stock in cooperative arrangement with an automated printer, where the label stock defines the identification band that comprises a base strip, a top strip adapted to engage the base strip to effect coverage of an electrically conductive circuit disposed therebetween, and adhesive disposed on at least a portion of at least one of the base strip or the top strip. Subsequent steps include printing indicia on at least one surface of the identification band with the printer, manually attaching the electrically conductive circuit to a surface of the identification band after the band exits the printer, and adhesively placing the top strip over the base strip such that the electrically conductive circuit is encased between the top and base strips.

According to yet another aspect of the present invention, a method of using an identification band is disclosed. The first step of the method comprises configuring a layer of label stock to include a base strip comprising a proximal end and a distal end, a top strip adapted to engage the base strip to effect coverage of an electrically conductive circuit disposed between them, a first adhesive layer disposed on at least a portion of the base strip to facilitate bonding between its proximal and distal ends, and a second adhesive layer peripherally disposed on at least a portion of at least one of the base strip or the top strip such that upon engagement between the two strips, an adhesive bond is formed of sufficient dimension as to preclude contact with an electrically conductive circuit disposed between the base strip and the top strip. Additional steps include providing the layer of the label stock to a printer, printing indicia on at least a portion of one surface of the layer of label stock, manually attaching the electrically conductive circuit to a surface of the layer of label stock after indicia has been printed on the surface, placing the top strip over the base strip such that the electrically conductive circuit is encased between them, placing the layer of label stock with the encased electrically conductive circuit adjacent an object to be identified, and forming the band by looping the layer of label stock around the object until the distal and proximal ends are brought into overlapping adhesive contact with one another.

Preferably, the electrically conductive circuit is an RFID tag, which can optionally be configured to include an underlying liner and release coating, as discussed in conjunction with the first embodiment. Optionally, the method further includes the step of removing the RFID tag from the identification band in order that the RFID tag may be reused. The relationship between the RFID tag and the identification band is such that upon separation of the two, the circuitry of the RFID tag does not become damaged. This can be accomplished through adhesive-free zones formed by the second adhesive layer such that the tag does not come in contact with any of the adhesive, as well as adhesively releasable contact between the top and base strips to improve separability without attendant tearing of the label stock layer. Release coating may optionally be employed in conjunction with adhesive to form the adhesively releasable contact between the strips. Preferably, the RFID tag is removed once the object to be identified no longer requires use of the tag, or if the integrity of the identification band becomes compromised due to soiling, contamination or damage.

According to another aspect of the present invention, a method of making an identification band is disclosed. The method comprises configuring an RFID tag to include a bonding layer disposed on one side thereof, and configuring a layer of label stock to include a base strip, a top strip adapted to engage the base strip to effect coverage of the RFID tag, a first adhesive layer disposed on at least a portion of the base strip to facilitate bonding between overlapping members of the base strip during formation of the band, a second adhesive layer disposed on at least a portion of at least one of the base strip or the top strip such that upon engagement therebetween, an adhesive bond is formed, and a release coating disposed on at least a portion of at least one of the base strip or the top strip. Additional steps include providing the layer of the label stock to a printer, printing indicia on at least one surface of the layer of the label stock, manually attaching the RFID tag to the layer of label stock after the printing step by placing the adhesive disposed on the one side of the tag in contact with the release coating, and placing the top strip over the base strip such that the RFID tag is encased between them. Optionally, the top strip is a flap integral with the base strip.

According to yet another aspect of the present invention, an identification band configured to bear printed indicia and electronic information is disclosed. The identification band is made up of a base strip, an integral top flap adapted to overlap the base strip, a first adhesive layer disposed on at least a portion of the base strip to facilitate bonding between overlapping members of the base strip during formation of the band, a second adhesive layer disposed on at least a portion of at least one of the base strip or the integral top flap, a release coating disposed on at least a portion of at least one of the base strip or the integral top flap, and a RFID tag stack including a RFID tag and a bonding layer disposed on one side thereof, where the RFID tag stack is disposed adjacent the release coating such that upon engagement therebetween, the RFID tag stack is secured thereto, whereby upon secured engagement of the RFID tag stack to the release coating, the base strip and the integral top flap are brought into overlapping engagement such that the second adhesive layer secures the base strip to the integral top flap. Optionally, the RFID tag stack further comprises a liner ply having a first surface and a second surface, where the second surface is disposed against the bonding layer such that the RFID tag is secured to the second surface. A layer of pressure sensitive adhesive is disposed on the first surface such that the layer of pressure sensitive adhesive is configured to secure the RFID tag stack to the release coating.

According to still another aspect of the present invention, an identification band configured to bear printed indicia and electronic information is disclosed. This aspect is similar to the previous, except that the integral top flap of the previous embodiment is replaced with a top strip that need not be integral with the base strip. As before, the base strip and the top strip are brought into engagement such that the second adhesive layer secures the base strip to the top strip. As with the previous embodiment, the RFID tag stack optionally further comprises a liner ply having a first surface and a second surface and a layer of pressure sensitive adhesive.

According to another aspect of the present invention, a method of manufacturing a carrier containing a plurality of RFID tags is disclosed. The method comprises the steps of configuring a quantity of a conventional label stock construction to define a substrate of the carrier such that it comprises a liner ply having a first surface and a second surface, a release coating on the first surface, a pressure sensitive adhesive in contact with the release coating, and a label face ply covering the adhesive. The liner ply is configured such that it can receive a plurality of RFID tags on its second surface, while each of the plurality of RFID tags includes a bonding layer. Additional steps include affixing the plurality of RFID tags to the liner ply by placing the bonding layer in adhesive contact with the liner ply, and arranging the quantity of label stock with the affixed plurality of RFID tags into a carrier form. The carrier form is then ready to dispense the affixed plurality of RFID tags sequentially from the label face ply. The affixed tags may be dispensed by manually unwinding the roll, peeling the liner away from the label face ply, and severing the liner between tags, or by means of an automatic dispensing, peeling, and cutting device.

Optionally, the carrier form can be a roll, a fan-fold stack, or a plurality of individual cut sheets. As an additional optional step, die cuts can be placed in the liner ply around each RFID tag to make removal of the RFID tag easier. The die cut is deep enough to cut through the liner ply yet stop short of the label face ply. The die cut creates a liner piece, or stack, upon which the RFID is adhered. The liner ply includes the release coating on its first surface. Thus, upon removal (such as manually peeling), the RFID tag and liner ply together can be applied to an exposed pressure sensitive adhesive region on an identification band. A releasable bond is formed between the pressure sensitive adhesive region and the release coating adhered to the liner ply, thus permitting clean removal of the RFID tag and liner ply from the identification band for possible re-use on a new identification band. As an additional option, the arranging step could comprise rolling the label stock into a cylindrical carrier form such that the RFID tags are disposed radially outward on the roll.

According to another aspect of the present invention, a method of manufacturing a carrier of RFID tags is disclosed. The method comprises the steps of configuring a plurality of RFID tags to each include a bonding layer disposed thereon, and configuring a quantity of a release liner having a first surface with release coating thereon and a second surface, where the second surface of the liner ply is adapted to receive a plurality of RFID tags. The release coating on the first surface is capable of forming a releasable bond with a pressure sensitive adhesive. Additional steps include affixing the plurality of RFID tags by contact between the bonding layer of the tags and the second surface of the liner, and arranging the liner and affixed RFID tags into a carrier form. The carrier form is then ready to dispense the affixed plurality of RFID tags sequentially. The affixed tags may be dispensed by manually severing the liner between tags, or by means of an automatic dispensing and cutting device.

As an optional step, the liner could be die-cut or perforated to permit easy separation between each adhered RFID tag without the need for a cutting or severing device. In the present context, a carrier is a substrate onto which the plurality of RFID tags may be mounted. In one optional embodiment, the carrier is in the form of a cylindrical roll, while in others it could be in fan-fold or individual cut sheet form. In the cylindrical roll embodiment, the arranging step would comprise rolling the label stock into a cylindrical form such that the RFID tags are disposed radially outward.

Other advantages and aspects of the present invention will become apparent upon reading the following description of the drawings in conjunction with the detailed description of the invention.

BRIEF DESCRIPTION OF THE DRAWINGS

FIG. 3A shows an identification band according to an embodiment of the present invention;

FIG. 3B shows an identification band according to an embodiment of FIG. 3A with an RFID tag disposed on a surface thereof;

FIG. 6 shows the inclusion of adhesive peripherally disposed on the top strip of the embodiment of FIGS. 3A and 3B;

FIG. 7 shows the inclusion of adhesive peripherally disposed on the top strip of the embodiment of FIGS. 5A and 5B;

FIGS. 9A and 9B show the various stages of placing the separate top strip onto the base strip and RFID tag of the identification band embodiment shown in FIGS. 5A and 5B;

FIGS. 11A through 11C show steps in the dispensing RFID tags from a roll;

DETAILED DESCRIPTION OF THE PREFERRED EMBODIMENTS

Figure 1:
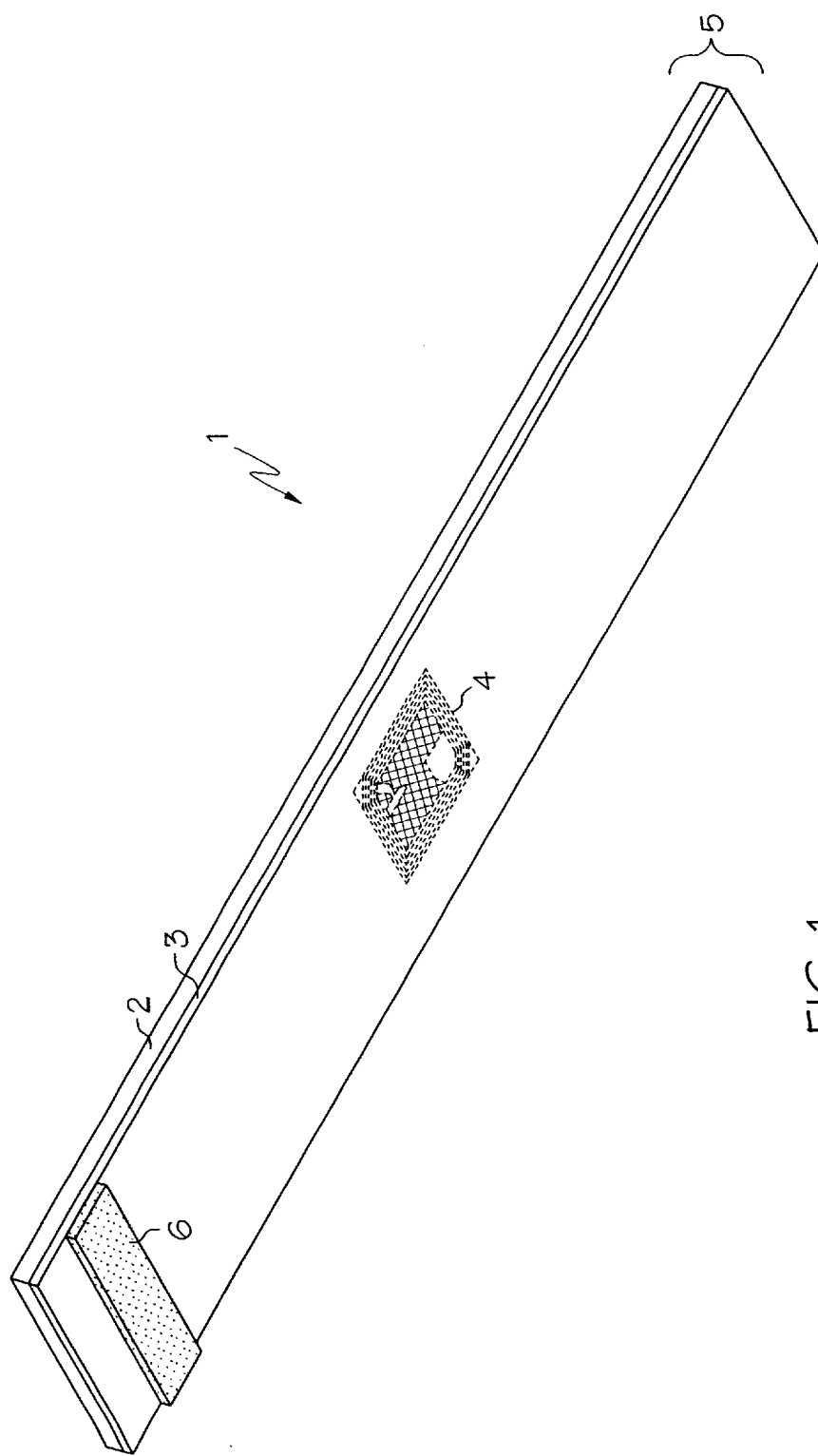
FIG. 1 shows an identification band according to the prior art.
Figure 2:
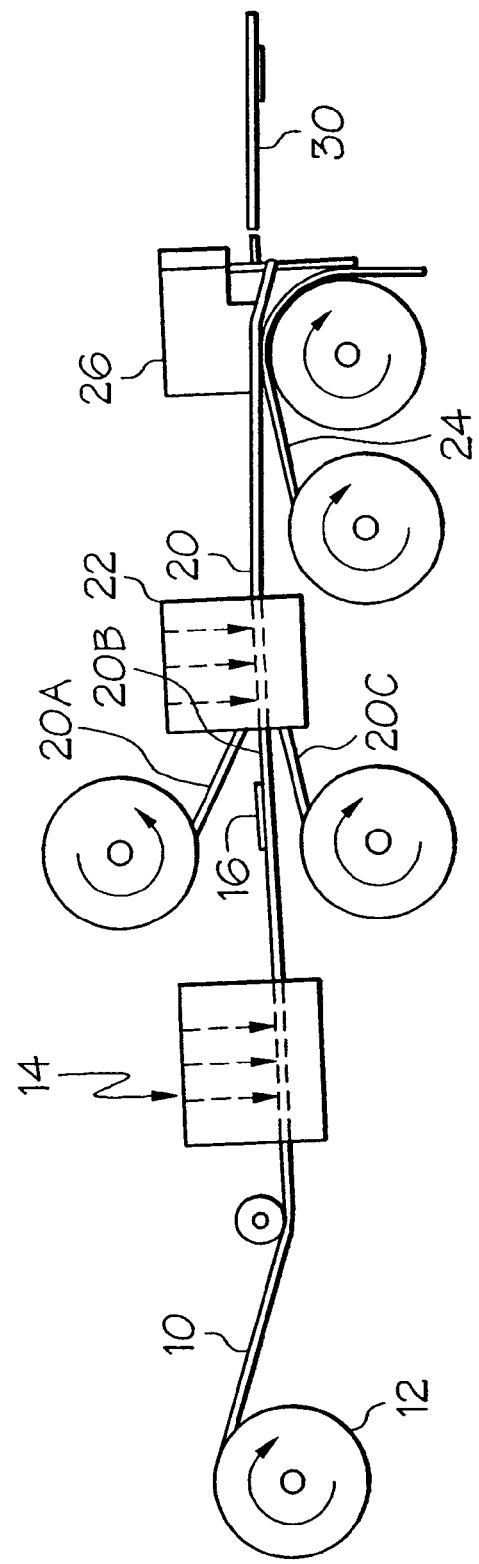
FIG. 2 shows the steps of laminating an identification band of the prior art.

Referring now to FIGS. 1 and 2, an identification band 1 and a method of fabricating it according to the prior art are shown. Identification band 1 is made up of two or more lamina 2, 3 between which an RFID tag 4 is disposed. The laminate construction 5 is often held together by adhesive coating (not shown). Typically, identification band 1 is made from an elongate flexible material, such as paper or plastic. An additional adhesive 6 is placed on at least a portion of one surface of the band 1 so that opposing ends can be looped together. The identification band 1 is often in the form of label stock 10 that is fed from a continuous roll 12. Typically, an RFID application stage 14 applies the RFID circuit 16 to the surface of label stock 10 through deposition of conductive ink or similar material. In the fabrication method shown in FIG. 2, a three-layer laminate 20 is constructed, where outer laminae 20A and 20C encase the intermediate lamina 20B, made up of label stock 10 and RFID circuit 16. The three layers are laminated together in a laminator 22. After laminating, an adhesive layer 24 is applied to the outer surface of the lower layer 20C. This adhesive layer 24 can include a liner (not shown) that can be peeled off prior to application to an appropriate item to be identified. A cutting station 26 is used to separate individual cut bands 30 from the continuous roll.

Referring now to FIGS. 3A and 3B, an identification band 100 according to an aspect of the present invention is disclosed. The band 100 includes a base strip 110 with a proximal end 112 and a distal end 114, and a top strip 120. The proximal and distal ends 112, 114 can be elongated (as shown in the present figures), short and tab-like (as shown elsewhere in the figures) or any length in-between, depending on the specifics of the end-use. It will be appreciated by those skilled in the art that all such lengths are within the purview of the present invention. At least one of the base strip 110 and top strip 120 includes a printable surface. In the present context, a surface is "printable" if it can accept printed indicia from either an automated printing device, or conventional writing instruments, such as pens, markers and pencils. A first adhesive layer 116 is disposed on at least one of the proximal and distal ends such that, upon wristband formation, the adhesive prevents it from coming apart. In the embodiment shown in the figures, top strip 120 is an integral flap with base strip 110 such that they are formed from a single piece of material. This can be of benefit in that the number of die cutting steps and related tooling are reduced, as is the chance for misplacement or misalignment of the flap in subsequent band assembly operations. In the integral case, the flap 120 can be folded along fold line 122 (which may be precreased, scored or perforated to facilitate accurate placement of the flap 120 on base strip 110). As shown with particularity in FIG. 3B, an RFID tag 130 can be placed on one of the two strips such that upon placement of the flap 120 onto the base strip 110, the RFID tag will be encased between them in a sandwich-like construction. Angle marks (not shown) may be preprinted to aid in accurate placement of RFID tag 130.

Figure 4A:
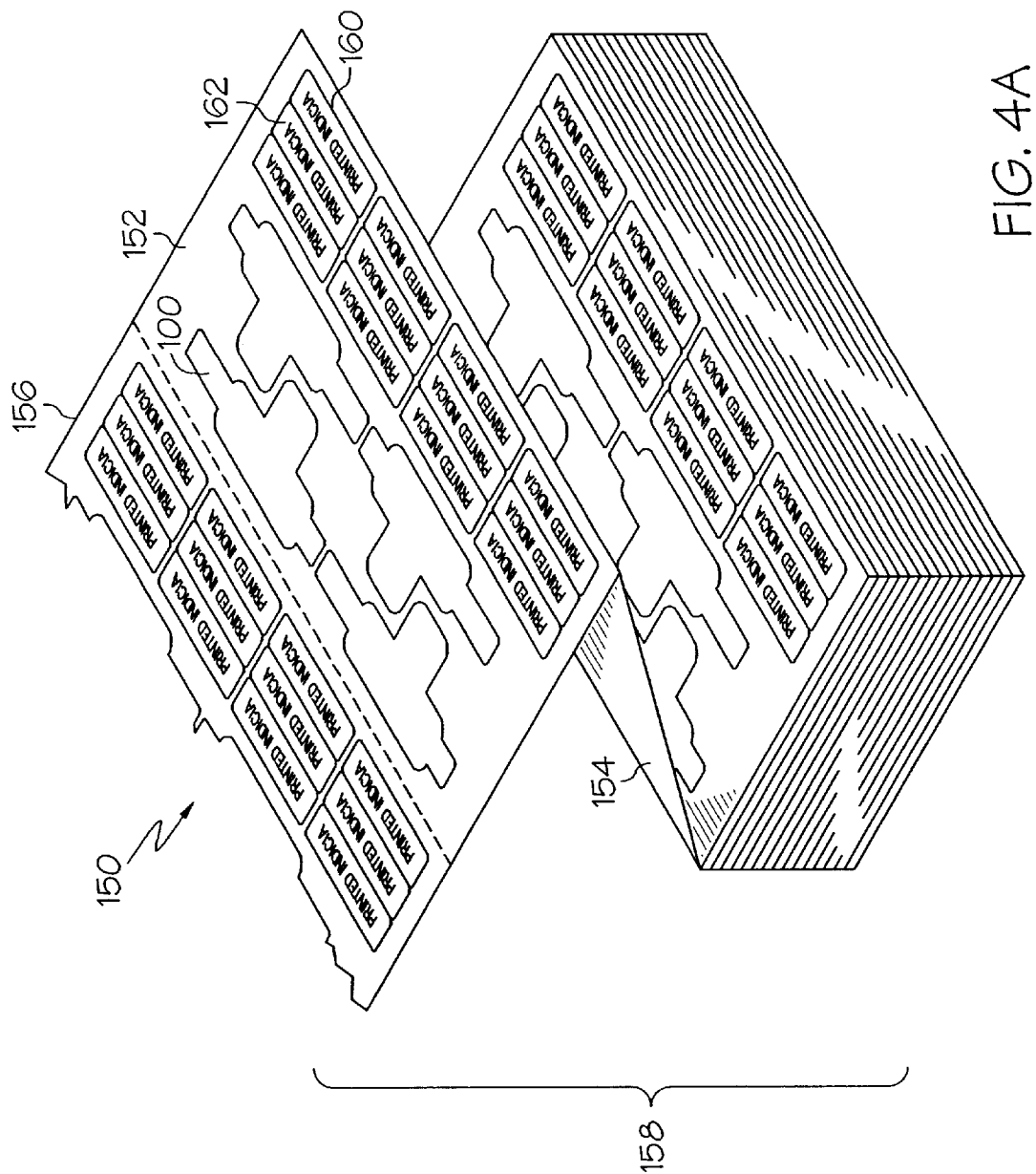
FIG. 4A shows a series of forms in a Z-fold configuration, each form containing a plurality of identification bands and labels.

As shown in FIG. 4, a plurality of bands 100 can fit on a single form 150, which comprises a face ply 152 and a liner ply 154. As with the band 100, the face ply material can be any material that readily accepts writing or printing, such as 0.002 inch thick (2 mils) white polyester film or paper. A plurality of labels 160 can be disposed adjacent the plurality of bands 100 on form 150, and both the labels 160 and the bands 100 can accept printed indicia 162 on a surface thereof. In addition, both the bands 100 and the labels 160, which make up a portion of the face ply 152, can be die cut for ease of removal from the form 150. Such indicia can be in the form of alphanumeric characters or bar code symbols, among others. Form 150, which can be made up of sheets 156 that can be individually stacked (such as when placed in a cut sheet paper tray of a laser printer (not shown)), or as part of a continuous roll or series. In the embodiment shown in the present figure, the form is comprised of a continuous series of Z-folded sheets 158, although conventional rolls are also envisioned. Preferably, the liner ply 154 is coextensive with the face ply 152, and the two are joined by adhesive and release (not shown). Release coating (not shown) may be used in select locations to improve the ease with which the bands 100 and labels 160 can be peeled away from the liner ply 154.

Figure 4B:
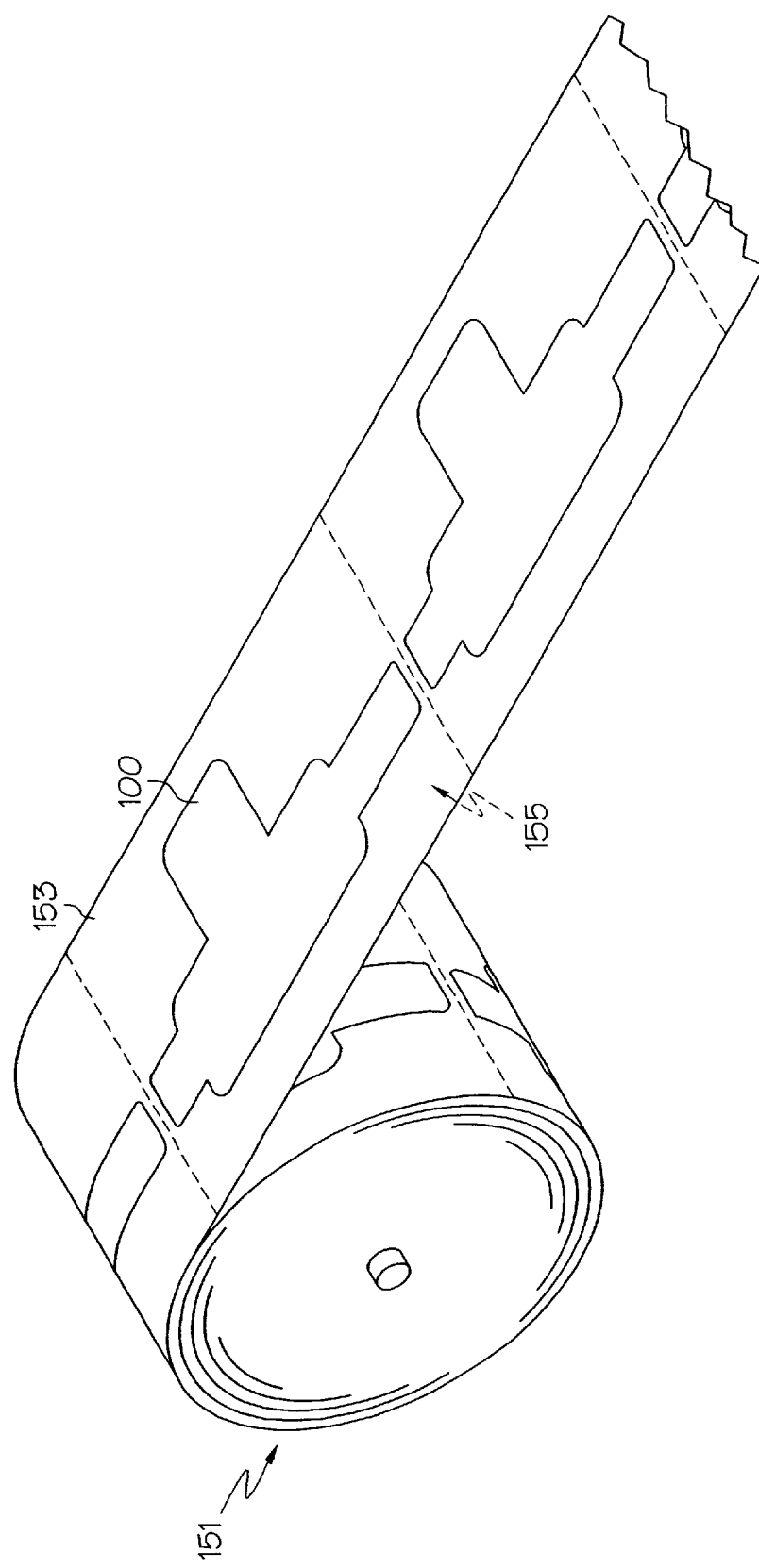
FIG. 4B shows a roll of forms, each form containing a single identification band.

Referring now to FIG. 4B, an alternative identification band form 151 is shown, where the identification bands 100 can be serially disposed on the form. As with the previous embodiment, the form includes a face ply 153 and a liner ply 155, where the identification band 100 can be die cut from the outer surface of the face ply 153. Although not presently shown, labels could be disposed adjacent the identification bands 100, also preferably die cut into the outer surface of the face ply 153. Also as with the previous embodiment, the roll configuration is compatible with automated printer devices so that indicia may be printed onto the identification bands 100 and labels.

Figure 5B:
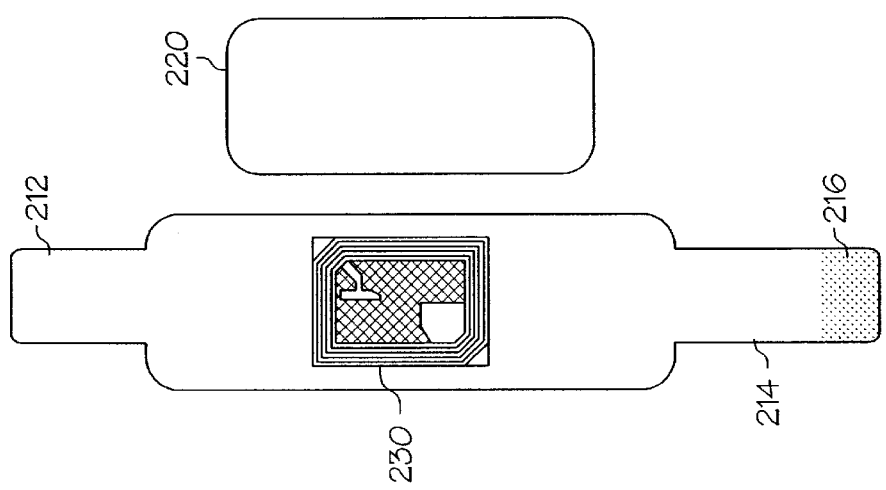
FIG. 5B shows an identification band according to the alternate embodiment of FIG. 5A with an RFID tag disposed on a surface thereof.
Figure 5A:
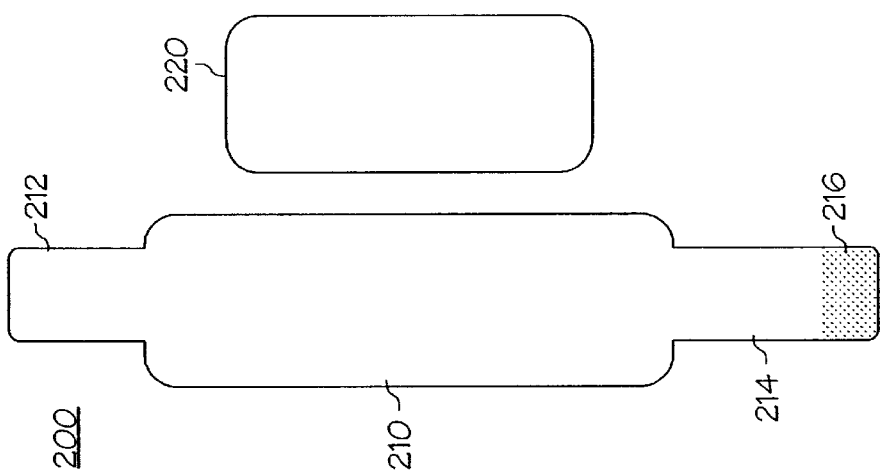
FIG. 5A shows an identification band according to an alternate embodiment.

Referring next to FIGS. 5A and 5B, a variation on the embodiment shown in FIGS. 3A and 3B is shown. As with that embodiment, an identification band 200 is disclosed. The band 200 includes a base strip 210 with a proximal end 212 and a distal end 214, and a top strip 220. A first adhesive layer 216 is disposed on at least one of the proximal and distal ends. Unlike the embodiment of FIGS. 3A and 3B, top strip 220 is separate from base strip 210. In this embodiment, top strip 220 can be placed on base strip 210 in any orientation compatible with the underlying RFID tag 230. While it is envisioned that the RFID tag 230 is preferably aligned axially with the elongate dimension of the base strip 210, such alignment is not necessary. For example, the elongate dimension of the top strip 220 could be placed at a right angle with respect to the elongate dimension of the base strip 210 such that (with appropriately disposed adhesive) overhanging ends of the top strip 220 could be folded over the sides of base strip 210 and adhered to the reverse side thereof, thereby providing enhanced attachment between the two strips. Similarly, the separate top strip 220 is more amenable to RFID tag 230 misalignment, as placement of the strip enjoys more flexibility compared to the attached flap of the previous embodiment. This can lead to fabrication cost savings, as strict control of RFID placement can be relaxed.

Referring next to FIGS. 6 and 7, the embodiments of the identification bands 100 and 200, respectively, are shown with a second adhesive layer 126, 226 disposed around the periphery of the surface of top strip 120, 220 to effect adhesive contact between the top strips and their respective base strips 110, 210. While the figures notionally depict the second adhesive layer 126, 226 disposed on the top strips 120, 220, it will be appreciated by those skilled in the art that the adhesive layers could instead be placed on the base strips 110, 210. The region bounded by the second adhesive layer 126, 226, referred to as an adhesive-free zone 128, 228 is of sufficient dimension relative to the RFID tags 130, 230 to substantially avoid contact between the RFID tags 130, 230 and the second adhesive layer 126, 226 upon placement and subsequent assembly of the RFID tag 130, 230 into the identification band 100, 200. By substantially avoiding contact between the adhesive and the tag, ease of tag removal and subsequent reuse is enhanced. In addition, the likelihood of RFID tag damage during its removal from a spent identification band is reduced.

Figure 8A:
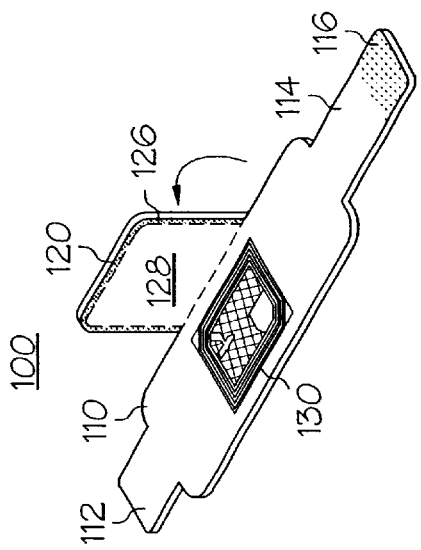
FIGS. 8A through 8C show the various stages of folding over the integral flap onto the base strip and RFID tag of the identification band embodiment shown in FIGS. 3A and 3B.
Figure 8C:
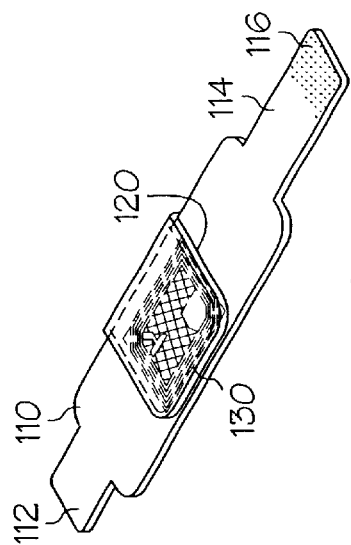
Figure 8B:
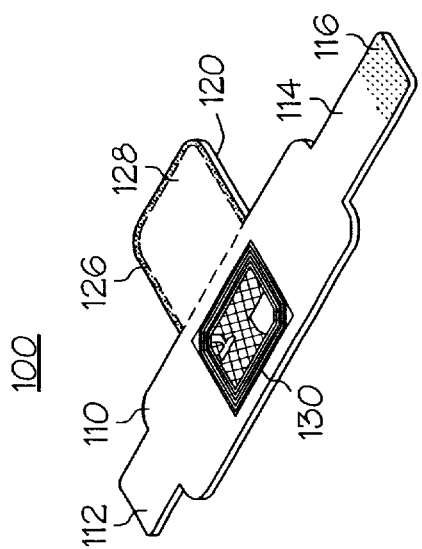

Referring next to FIGS. 8A through 8C, the steps associated with attaching a RFID tag 130 to the identification band 100 of FIG. 6 is shown. It is preferable that, prior to these steps, printed indicia (not presently shown) can be placed onto one or more of the surfaces of the base strip 110 or flap 120 by passing the identification bands 100 through an automated printer. As shown previously, the identification band 100 may be part of a form that can be continuously fed from a roll or stack, as well as from individual cut sheets. In FIG. 8A, RFID tag 130 is shown placed onto the flap-engaging surface of base strip 110. In FIGS. 8B and 8C, flap 120, which is integral with a lateral portion of base strip 110, is folded over until the base strip-engaging surface (which includes second adhesive layer 126) comes into adhesive contact with the flap-engaging surface of base strip 110, thereby encasing the RFID tag 130 therebetween. The placement of the second adhesive layer 126 is such that upon encasing the RFID tag 130, contact between the adhesive and the tag is avoided. Once these steps are completed, the identification band 100 is ready to be secured to the object to be identified.

Referring next to FIGS. 9A and 9B, the steps associated with attaching a RFID tag 230 to the identification band 200 of FIGS. 5A and 5B is shown. As with the steps shown in FIGS. 8A through 8C, the top strip 220 is placed into adhesive engagement with base strip 210, the difference being that no folding operation is necessary, as the separate top strip 220, not constrained in its placement relative to the base strip 210 prior to adhesion between them, can be placed in any orientation compatible with the RFID tag 230.

Figure 10C:
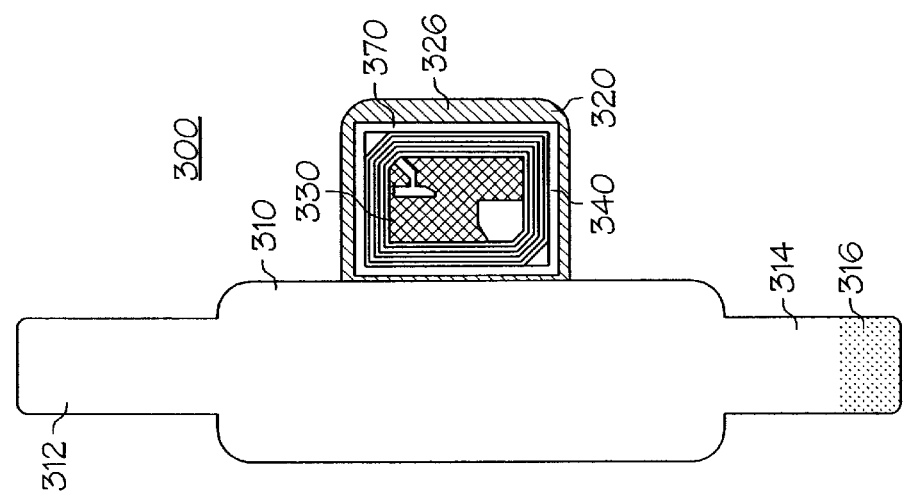
FIGS. 10A through 10C show the various stages of placing an alternate embodiment for placing a RFID tag onto an identification band.
Figure 10B:
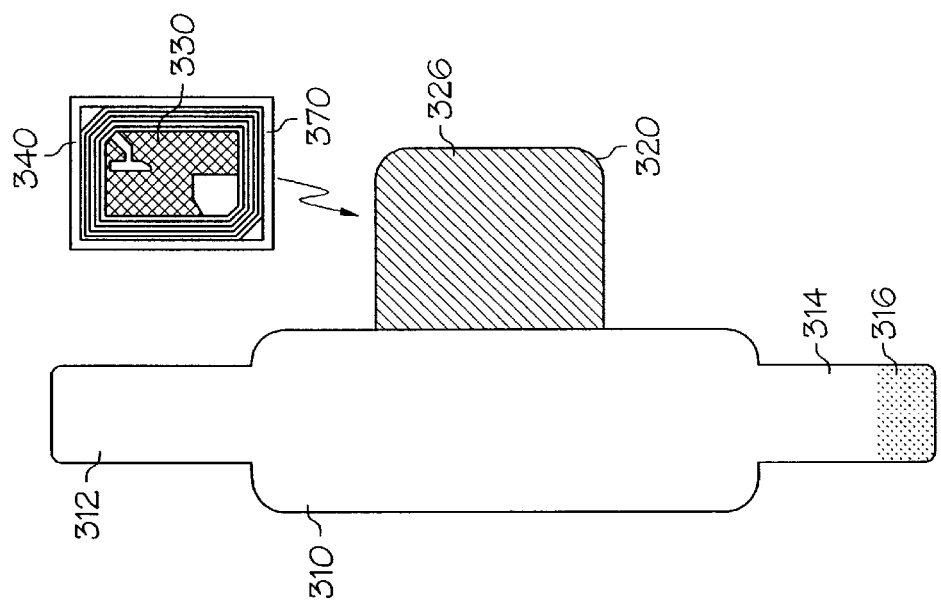
Figure 10A:
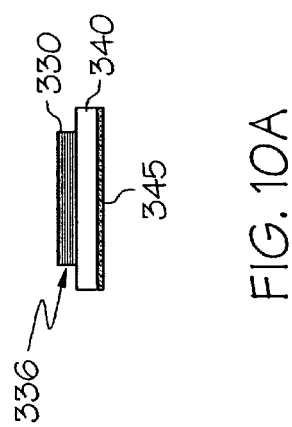

Referring next to FIGS. 10A through 10C, an alternate embodiment of the present invention is shown. Identification band 300, including base strip 310, proximal end 312, distal end 314, first adhesive layer 316 and top strip 320 (shown in the present figure as an integral top flap, but understood to also encompass a separate strip, as shown in previous embodiments) are similar to that of previous embodiments, with the exception that the second adhesive layer 326 (shown disposed on top strip 320, but equally applicable to base strip 310) need not be patterned such that it only peripherally circumscribes an adhesive-free zone on either the base strip 310 or the top strip 320. In the present configuration, the RFID chip 330 can be configured as part of a RFID tag stack, where the RFID chip 330 comes pre-affixed to a liner 340 by having a bonding layer 336 disposed between them, as shown with particularity in FIG. 10A. A release coating 345, preferably silicone or like material, is disposed on the side of the liner 340 opposite that to which the RFID chip 330 is attached. Liner 340 could also be slightly oversized relative to the RFID chip 330 such that it defines a picture frame-like extension 370 beyond the RFID chip's outer boundary. An example of this configuration is described below in conjunction with FIGS. 11A and 11B. The RFID chip 330 (with bonding layer 336, liner 340 and release coating 345) can be manually attached to the base strip 310 or top strip 320 of the identification band 300 by pressing it until the release coating 345 contacts the underlying second adhesive layer 326, as shown in FIG. 10B. Once attached, the RFID chip 330, while secured to the identification band 300, is isolated from the second adhesive layer 326 by the presence of the intervening liner 340 and release coating 345, as shown in FIG. 10C.

Referring next to FIGS. 11A through 11C, a way of manufacturing a roll of RFID tags 430 is shown. In this approach, a conventional cylindrical form 451 of label stock 450 (which typically includes a facestock 453 (alternately referred to as a label face ply) over an adhesive layer 426, release coating 445 and liner 440 (alternately referred to as a liner ply)) is used effectively "upside down", in that the facestock 453 (normally a surface onto which indicia is printed) is used instead as a base ply such that the traditional base ply (defined by liner 440) is the surface to which the RFID tags 430 will be attached. Any or all of the multiple layers of label stock 450 are alternately referred to as a RFID tag stack, and make up a variation on the stack shown in FIG. 10A. The cylindrical form 451 is produced by unravelling a conventional roll and then taking it up on an inverting spool (neither of which are shown). The cylindrical form 451 can be passed through a press (not shown) to place die cuts 433 in the liner 440 and release coating 445. RFID tags 430 are placed onto the liner 440, and held in place by a bonding layer 436, on an opposing surface, a layer of release coating 445, such as silicone. In situations where the die cut 433 has been made (such as that shown with particularity in FIG. 11A), the RFID tags 430 are preferably placed within the area of liner 440 defined by the die cut 433, forming an extension 470, which by placing space between the edge of the circuitry of the RFID tag 430 and adhesive disposed on an overlying surface (such as a base strip or top strip), reduces the likelihood of interaction between the two. In addition, the extension 470 allows easier peeling and subsequent removal of the RFID tag stack. The application of a plurality of RFID tags 430 to the liner 440 can be accomplished either manually or by automated machine. Once the RFID tags 430 are attached, the long, continuous strand of label stock 450 can be rolled up into cylindrical form 451, which can then be used for dispensing, as shown in FIG. 11C, where individual RFID tags 430 can be peeled away from the liner 440 one at a time and attached to an identification band (not presently shown). It will be appreciated by those skilled in the art that the label stock 450 could also be in the form of a fan-fold stack or a stack of individually cut sheets (neither of which are shown), rather than cylindrical form 451. With either the fan-fold or individual cut sheet forms, the attachment configuration between the RFID tag 430 and the form liner 440 would be the same.

Figure 12:
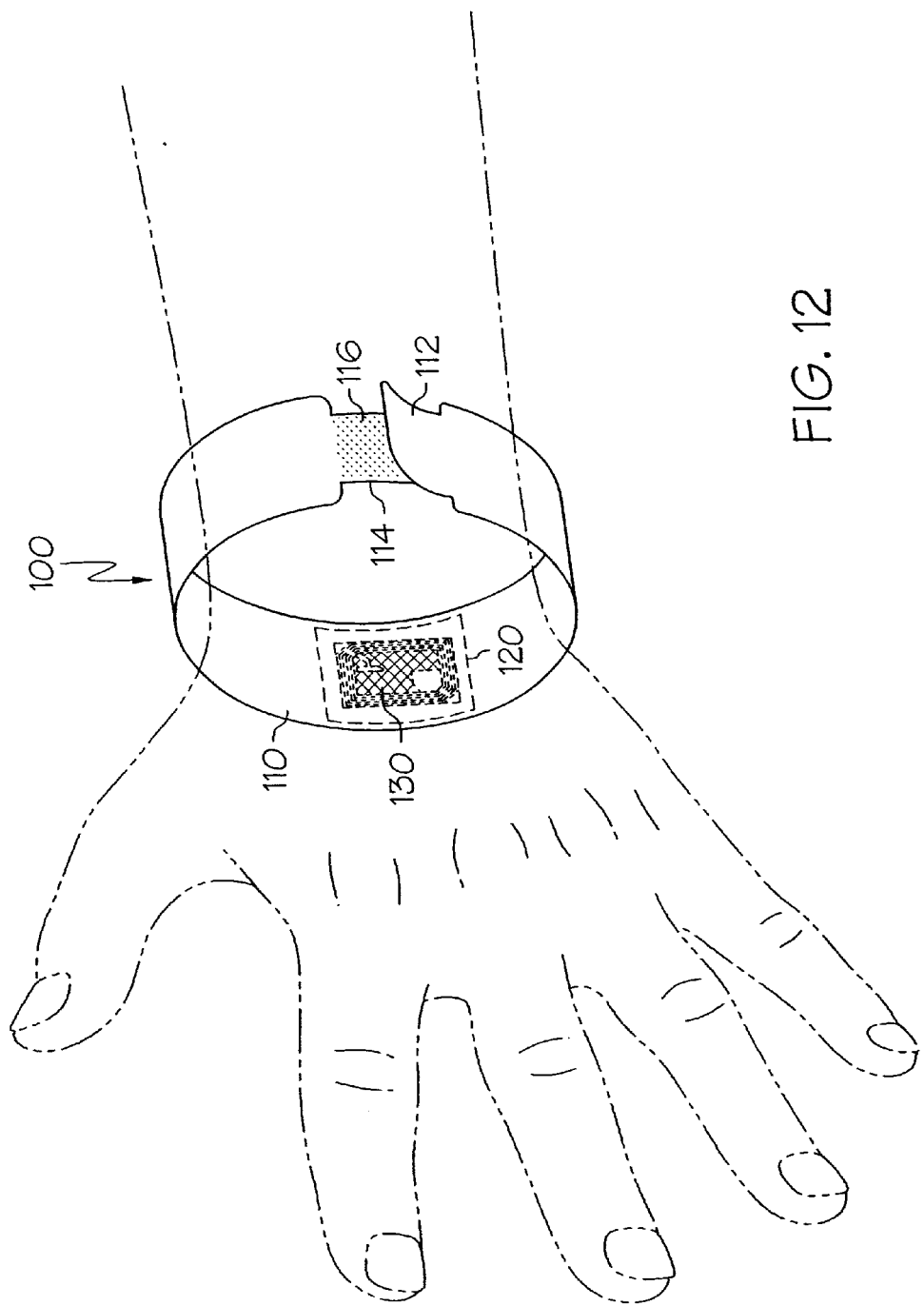
FIG. 12 shows the placement of the identification band embodiment of FIGS. 3A and 3B around the wrist of a wearer.

Referring next to FIG. 12, the placement of the identification band 100 of the FIG. 6 is shown placed around a wearer's wrist. Depending on the size of the wrist to which the identification band 100 is being attached, the proximal and distal ends 112, 114 of the base strip 110 are brought into looped contact with one another (for larger wrists) or have one end overlap beyond the other (for smaller wrists) until the first adhesive layer 116 contacts an adjoining base strip surface to bond them together. In the present context, when bonding is said to be effected between the proximal and distal ends of the base strip, it will be understood that this includes situations where there is considerable overlap (such as when the band is attached to a small wrist or object of diminutive circumference) such that even if the opposing ends are not adjacent one another due to such overlap, the adhesive contact used to keep the band together will be considered to occupy the respective ends. It will be appreciated that while shown disposed only on distal end 114, first adhesive layer 116 could alternatively or additionally be disposed on proximal end 112. In either the presently shown identification band embodiment or the embodiment of the identification band shown in FIGS. 5A and 5B, it is possible to orient the side of the base strip that has the RFID tag and top strip attached to it to face radially inward or outward. By facing radially inward, exposure of the seams associated with the top strip to forces that could cause band delamination or damage are minimized.

Figure 13D:
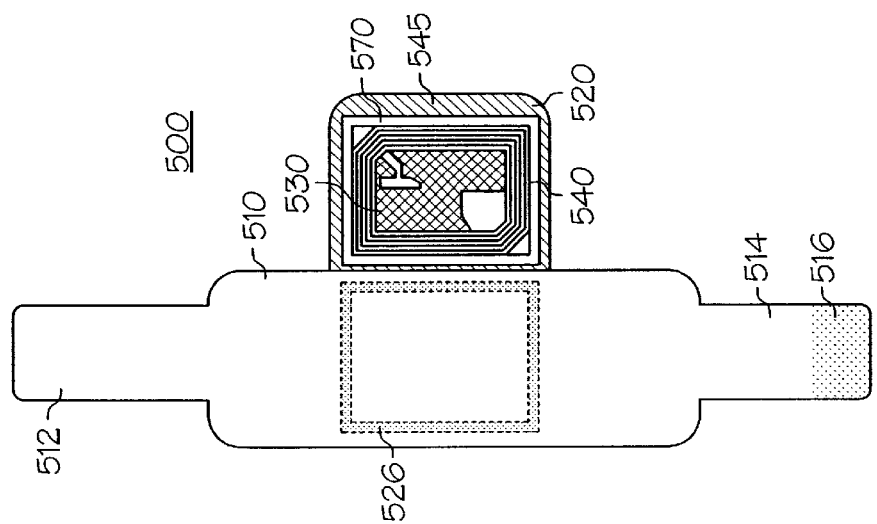
FIGS. 13A through 13D show a variation of the embodiment of FIGS. 10A through 10C.
Figure 13C:
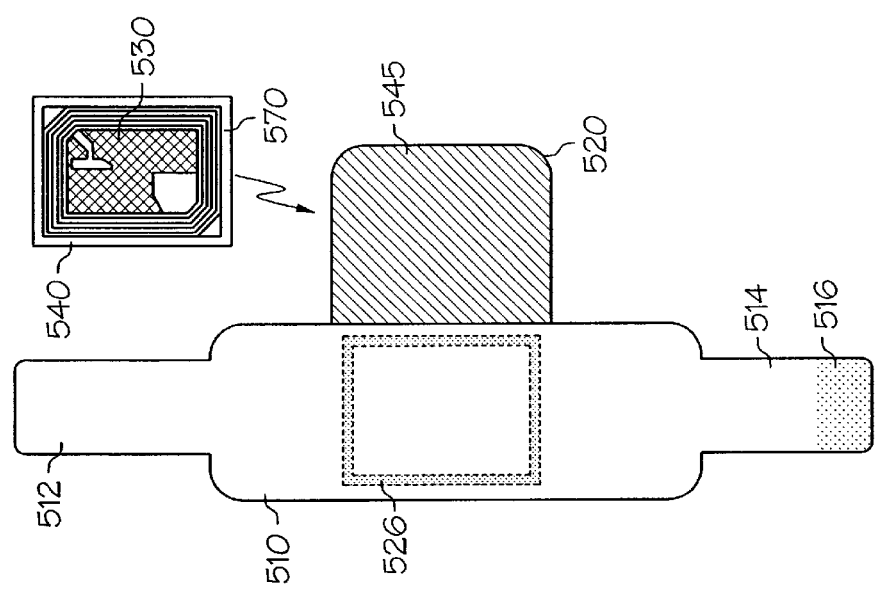
Figure 13A:
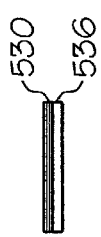
Figure 13B:
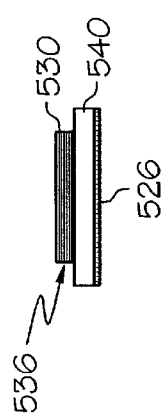

Referring next to FIGS. 13A through 13D, a variation on the embodiment shown in FIGS. 10A through 10C is shown. In this embodiment, the RFID tag stack can be either a small stack, shown in FIG. 13A as having an RFID tag 530 with a bonding layer 536 adhered to one side, or a large stack with RFID tag 530, bonding layer 536 adhered to one side, a liner ply 540 and a layer of pressure sensitive adhesive 526. The identification band 500 (shown presently as having an integral flap 520, but also applicable to the previous embodiment bands having a separate top strip), includes a layer of release coating 545 on either the base strip 510 or (as shown) on flap 520. Since the lowermost layer 536, 526 respectively of either the stack of FIG. 13A or 13B is an adhesive, it can be used to mount the stack onto the release coating 545, thereby securing it in place and allowing the placement of the flap 520 onto the base strip 510. In the embodiment shown in FIGS. 13C and 13D, if the release coating is disposed on the flap 520, an additional layer of pressure sensitive adhesive 526 can be placed on a complementary surface of the base strip 510 to allow bonding between flap 520 and base strip 510. In such case, a portion of the surface of flap 520 that complements the pressure sensitive adhesive 526 placed on base strip 510 may leave the release coating 545 off, thereby permitting a permanent bond between the flap 520 and base strip 510.

Having described the invention in detail and by reference to preferred embodiments thereof, it will be apparent that modifications and variations are possible without departing from the scope of the invention defined in the appended claims.

We claim:

1. A method of making an identification band, comprising:
   configuring a layer of label stock to include:
      a base strip;
      a top strip adapted to engage said base strip to effect coverage of an electrically conductive circuit disposed therebetween;
      a first adhesive layer disposed on at least a portion of said base strip to facilitate bonding between overlapping members of said base strip during formation of said band; and
      a second adhesive layer disposed on at least a portion of at least one of said base strip or said top strip such that upon engagement therebetween, an adhesive bond is formed;
   providing said layer of said label stock to a printer;
   printing indicia on at least one surface of said layer of said label stock;
   manually attaching said electrically conductive circuit to a surface of said layer of said label stock after said printing step;
   placing said top strip over said base strip such that said electrically conductive circuit is encased therebetween.

2. A method according to claim 1, wherein said electrically conductive circuit is an RFID tag.

3. A method according to claim 2, wherein said RFID tag is affixed to a liner prior to said manually attaching step, and said liner includes a layer of release coating disposed on a side opposite that to which said RFID tag is affixed such that said step of manually attaching is accomplished by pressing said RFID tag, affixed liner and release coating onto said second adhesive layer, thereby engaging said second adhesive layer to said release coating.

4. A method according to claim 1, wherein said top strip is a flap integral with said base strip.

5. A method according to claim 4, wherein said integral flap is disposed on a lateral side of said base strip.

6. A method according to claim 4, wherein upon adhesion to said base strip and subsequent band formation, said integral flap is configured to face radially inward.

7. A method according to claim 1, wherein said label stock is further defined by a printable face ply and a liner ply, said face and liner plies coupled through adhesive and release coating disposed therebetween, said face ply defined at least in part by said base strip and said top strip.

8. A method according to claim 7, wherein said liner ply is substantially coextensive with said face ply.

9. A method according to claim 1, wherein said second adhesive layer is peripherally disposed beyond the outer dimensions of said electrically conductive circuit in order to substantially preclude contact therewith.

10. A method according to claim 1, wherein said printing step is accomplished with an automated printer.

11. A method according to claim 10, wherein said automated printer is a laser printer.

12. An identification band configured to bear printed indicia and electronic information, said identification band comprising:
   a base strip;
   an integral top flap adapted to overlap said base strip to effect coverage of an electrically conductive circuit disposed therebetween;
   a first adhesive layer disposed on at least a portion of said base strip to facilitate bonding between overlapping members of said base strip during formation of said band; and
   a second adhesive layer disposed on at least a portion of at least one of said base strip or said integral flap, said second adhesive layer substantially circumscribing an adhesive-free zone on at least one of said base strip or said integral flap, said adhesive-free zone configured to accept said electrically conductive circuit adjacent at least one of said base strip or said integral flap such that upon adhesive engagement therebetween, said electrically conductive circuit is secured therein.

13. An identification band according to claim 12, wherein said electrically conductive circuit is an RFID tag.

14. An identification band according to claim 13, wherein said RFID tag is affixed to a liner, and said liner includes a layer of release coating disposed on a side opposite that to which said RFID tag is affixed, such that said release coating and said second adhesive layer are in adhesive contact with one another.

15. An identification band according to claim 12, wherein said integral flap is disposed on a lateral side of said base strip.

16. An identification band according to claim 15, wherein upon adhesion to said base strip and subsequent band formation, said integral flap is configured to face radially inward.

17. A form adapted to cooperate with an automated printer such that indicia can be placed on said form from said printer, said form comprising:
   a face ply with a plurality of identification bands disposed therein, each of said identification bands including:
      a base strip;
      an integral top flap adapted to overlap said base strip to effect coverage of an electrically conductive circuit disposed therebetween;
      a first adhesive layer disposed on at least a portion of said base strip to facilitate bonding between overlapping members of said base strip during formation of said band; and
      a second adhesive layer disposed on at least a portion of at least one of said base strip or said integral top flap;
   a liner ply disposed substantially coextensive with said face ply;
   an interply adhesive disposed between at least a portion of said face and liner plies; and
   a release coating disposed between at least a portion of said face and liner plies to facilitate removable adhesion therebetween.

18. A form according to claim 17, wherein said second adhesive layer substantially circumscribes an adhesive-free zone, said adhesive-free zone configured to accept said electrically conductive circuit.

19. A form according to claim 17, wherein said plurality of identification bands are die cut into said face ply.

20. A form according to claim 17, wherein said integral top flap is disposed on a lateral side of said base strip.

21. A form according to claim 20, wherein upon adhesion to said base strip and subsequent band formation, said integral flap is configured to face radially inward.

22. A form adapted to cooperate with an automated printer such that indicia can be placed on said form from said printer, said form comprising:
- a face ply with a plurality of identification bands disposed therein, each of said identification bands including:
  - a base strip defined by at least one printable surface;
  - a top strip adapted to engage said base strip to effect coverage of an electrically conductive circuit disposed therebetween, said top strip sized relative to said base strip such that upon coverage of said electrically conductive circuit therebetween, said base and top strips are not coextensive with one another;
  - a first adhesive layer disposed on at least a portion of said base strip to facilitate bonding between overlapping members of said base strip during formation of said band; and
  - a second adhesive layer disposed on at least a portion of at least one of said base strip or said top strip such that upon engagement therebetween, an adhesive bond is formed;
- a liner ply disposed substantially coextensive with said face ply;
- an interply adhesive disposed between at least a portion of said face and liner plies; and
- a release coating disposed between at least a portion of said face and liner plies to facilitate removable adhesion therebetween.

23. A method of making a wristband comprising:
configuring a layer of label stock to include:
- a plurality of elongate base strips each of which includes a proximal end and a distal end substantially opposite said proximal end;
- a plurality of top strips, each adapted to engage one of said plurality of elongate base strips to form a base strip-top strip pair, said base strip-top strip pair configured to effect coverage of an electrically conductive circuit disposed therebetween;
- a first adhesive disposed on at least a portion of each of said plurality of elongate base strips to facilitate bonding between said proximal and distal ends when placed in overlapping contact with one another during formation of said wristband; and
- a second adhesive layer disposed on at least a portion of said base strip-top strip pair such that upon engagement between said base strip and said top strip, an adhesive bond is formed;

providing said layer of said label stock to a printer;
printing indicia on at least one surface of said layer of said label stock;
manually attaching said electrically conductive circuit to a surface of at least one said base strip-top strip pair; and
placing said top strip of said at least one base strip-top strip pair over corresponding said elongate base strip such that said electrically conductive circuit is adhesively encased therebetween.

24. A method of making an identification band comprising:
configuring a layer of label stock to include:
- a base strip;
- a flap integral with said base strip;
- a first adhesive layer disposed on at least a portion of said base strip to facilitate bonding between overlapping members of said base strip during formation of said band; and
- a second adhesive layer disposed on at least a portion of at least one of said base strip or said flap;

providing said layer of said label stock to a printer;
printing indicia on at least one surface of said layer of said label stock;
manually attaching a RFID tag to a surface of said layer of said label stock after indicia has been printed on said at least one surface of said label stock; and
folding said flap over said base strip such that said RFID tag is encased therebetween.

25. A method according to claim 24, comprising the additional step of patterning said second adhesive layer such that an adhesive bond is formed of sufficient dimension as to preclude contact with an RFID tag disposed between said base strip and said flap.

26. A method according to claim 24, wherein said RFID tag is affixed to a liner prior to said manually attaching step, and said liner includes a layer of release coating disposed on a side opposite that to which said RFID tag is affixed such that said step of manually attaching is accomplished by pressing said RFID tag, affixed liner and release coating onto said second adhesive layer, thereby engaging said second adhesive layer to said release coating.

27. A method of providing information to an identification band comprising:
placing label stock in cooperative arrangement with an automated printer, said label stock configured to define said identification band, said identification band comprising:
- a base strip;
- a top strip adapted to engage said base strip to effect coverage of an electrically conductive circuit disposed therebetween; and
- adhesive disposed on at least a portion of at least one of said base strip or said top strip;

printing indicia on at least one surface of said identification band with said printer;
manually attaching said electrically conductive circuit to a surface of said identification band after said band exits said printer; and
adhesively placing said top strip over said base strip such that said electrically conductive circuit is encased therebetween.

28. A method according to claim 27, wherein said automated printer is a laser printer.

29. A method of using an identification band comprising:
configuring a layer of label stock to include:
- a base strip comprising a proximal end and a distal end;
- a top strip adapted to engage said base strip to effect coverage of an electrically conductive circuit disposed therebetween;
- a first adhesive layer disposed on at least a portion of said base strip to facilitate bonding between said proximal and distal ends; and
- a second adhesive layer peripherally disposed on at least a portion of at least one of said base strip or said top strip such that upon engagement therebetween, an adhesive bond is formed of sufficient dimension as to preclude contact with an electrically conductive circuit disposed between said base strip and said top strip;

providing said layer of said label stock to a printer;

printing indicia on at least a portion of one surface of said layer of label stock;

manually attaching said electrically conductive circuit to a surface of said layer of label stock after indicia has been printed thereon;

placing said top strip over said base strip such that said electrically conductive circuit is encased therebetween;

placing said layer of label stock with said encased electrically conductive circuit adjacent an object to be identified; and forming said band by looping said layer of label stock around said object until said distal and proximal ends are brought into overlapping adhesive contact with one another.

30. A method according to claim 29, wherein said electrically conductive circuit is an RFID tag.

31. A method according to claim 30, wherein said RFID tag is affixed to a liner prior to said manually attaching step, and said liner includes a layer of release coating disposed on a side opposite that to which said RFID tag is affixed such that said step of manually attaching is accomplished by pressing said RFID tag, affixed liner and release coating onto said second adhesive layer, thereby engaging said second adhesive layer to said release coating.

32. A method according to claim 30, further including the step of removing said RFID tag from said identification band in order that said RFID tag may be reused.

33. A method of making an identification band, comprising:

configuring an RFID tag to include a bonding layer disposed on one side thereof;

configuring a layer of label stock to include:
a base strip;
a top strip adapted to engage said base strip to effect coverage of said RFID tag upon disposal of said tag therebetween;
a first adhesive layer disposed on at least a portion of said base strip to facilitate bonding between overlapping members of said base strip during formation of said band;
a second adhesive layer disposed on at least a portion of at least one of said base strip or said top strip such that upon engagement therebetween, an adhesive bond is formed; and
a release coating disposed on at least a portion of at least one of said base strip or said top strip;

providing said layer of said label stock to a printer;

printing indicia on at least one surface of said layer of said label stock;

manually attaching said RFID tag to said layer of label stock after said printing step by placing said second adhesive layer disposed on said one side of said tag in contact with said release coating; and placing said top strip over said base strip such that said RFID tag is encased therebetween.

34. A method according to claim 33, wherein said top strip is a flap integral with said base strip.

35. An identification band configured to bear printed indicia and electronic information, said identification band comprising:

a base strip;
an integral top flap adapted to overlap said base strip;
a first adhesive layer disposed on at least a portion of said base strip to facilitate bonding between overlapping members of said base strip during formation of said band;
a second adhesive layer disposed on at least a portion of at least one of said base strip or said integral top flap;
a release coating disposed on at least a portion of at least one of said base strip or said integral top flap; and
a RFID tag stack including:
a RFID tag; and
a bonding layer disposed on one side of said RFID tag, said RFID tag stack disposed adjacent said release coating such that upon engagement therebetween, said RFID tag stack is secured thereto, whereby upon secured engagement of said RFID tag stack to said release coating, said base strip and said integral top flap are brought into overlapping engagement such that said second adhesive layer secures said base strip to said integral top flap.

36. An identification band according to claim 35, wherein said RFID tag stack further comprises:

a liner ply having a first surface and a second surface, said second surface disposed against said bonding layer such that said RFID tag is secured to said second surface; and a layer of pressure sensitive adhesive disposed on said first surface such that said layer of pressure sensitive adhesive is configured to secure said RFID tag stack to said release coating.

37. An identification band configured to bear printed indicia and electronic information, said identification band comprising:

a base strip;
a top strip adapted to engage said base strip;
a first adhesive layer disposed on at least a portion of said base strip to facilitate bonding between overlapping members of said base strip during formation of said band;
a second adhesive layer disposed on at least a portion of at least one of said base strip or said top strip;
a release coating disposed on at least a portion of at least one of said base strip or said top strip; and
a RFID tag stack including:
a RFID tag; and
a bonding layer disposed on one side of said RFID tag, said RFID tag stack disposed adjacent said release coating such that upon engagement therebetween, said RFID tag stack is secured thereto, whereby upon secured engagement of said RFID tag stack to said release coating, said base strip and said top strip are brought into engagement such that said second adhesive layer secures said base strip to said top strip.

38. An identification band according to claim 37, wherein said RFID tag further comprises:

a liner ply having a first surface and a second surface, said second surface disposed against said bonding layer such that said RFID tag is secured to said second surface; and a layer of pressure sensitive adhesive disposed on said first surface such that said layer of pressure sensitive adhesive is configured to secure said RFID tag stack to said release coating.

39. A method of manufacturing a carrier containing a plurality of RFID tags, said method comprising:

configuring a quantity of label stock to define a substrate of said carrier, said label stock including:
a liner ply having a first surface and a second surface, said second surface configured to receive said plurality of RFID tags thereon;

a release coating disposed on said first surface;

a pressure sensitive adhesive in contact with said release coating; and a label face ply covering said pressure sensitive adhesive;

configuring each of said plurality of RFID tags to include a bonding layer disposed thereon;

affixing said plurality of RFID tags to said liner ply by placing said bonding layer in adhesive contact with said second surface of said liner ply; and arranging said quantity of label stock with said affixed plurality of RFID tags into a carrier form, said carrier form configured to dispense said affixed plurality of RFID tags sequentially.

40. A method according to claim 39, wherein said carrier form comprises a roll, a fan-fold stack, or a plurality of individual cut sheets.

41. A method according to claim 39, comprising the additional step of die cutting a region around each said RFID tag to facilitate manual removal of said RFID tag and the portion of said bonding layer and liner ply defined by said die cut region from said carrier form.

42. A method according to claim 41, wherein the part of said liner ply outlined by said die cut region encompasses an adhesive-free zone, said adhesive-free zone configured to accept said RFID tag.

43. A method according to claim 39, wherein said step of arranging said quantity of label stock comprises rolling said quantity of label stock into a cylindrical carrier form such that said plurality of RFID tags are disposed radially outward.

44. A method of manufacturing a carrier containing a plurality of RFID tags, said method comprising:

configuring a plurality of RFID tags to each include a bonding layer disposed thereon;

configuring a quantity of a release liner, said release liner including:

a first surface; and a second surface adapted to receive said plurality of RFID tags;

a release coating disposed on said first surface such that said release coating is capable of forming a releasable bond with a pressure sensitive adhesive;

affixing said plurality of RFID tags by contact between each said bonding layer and a corresponding portion of said second surface;

arranging said liner with said affixed plurality of RFID tags into a carrier form, whereby said affixed plurality of RFID tags may be dispensed by severing said liner between tags, or by means of an automatic dispensing and cutting device.

45. A method according to claim 44, wherein said release liner could be die-cut or perforated to permit easy separation between each affixed RFID tag without the need for a cutting or severing device.

46. A method according to claim 44, wherein said carrier form comprises a roll, a fan-fold stack, or a plurality of individual cut sheets.

47. A method according to claim 44, wherein said step of arranging said quantity of release liner comprises rolling said quantity of release liner into a cylindrical carrier form such that said plurality of RFID tags are disposed radially outward.

* * * * *

UNITED STATES PATENT AND TRADEMARK OFFICE
CERTIFICATE OF CORRECTION

PATENT NO. : 6,836,215 B1
DATED : December 28, 2004
INVENTOR(S) : Laurash et al.

It is certified that error appears in the above-identified patent and that said Letters Patent is hereby corrected as shown below:

Column 2,
Line 41, "modem" should read -- modern --

Signed and Sealed this

Twenty-first Day of June, 2005

JON W. DUDAS
*Director of the United States Patent and Trademark Office*